United States Patent [19]

Ibaraki et al.

[11] Patent Number: 5,772,552
[45] Date of Patent: Jun. 30, 1998

[54] GEAR TRANSMISSION UNIT FOR AUTOMATIC TRANSMISSION

[75] Inventors: Ryuji Ibaraki; Kunio Morisawa; Jiro Yoshizumi, all of Toyota, Japan

[73] Assignee: Toyota Jidosha Kabushiki Kaisha, Toyota, Japan

[21] Appl. No.: 822,708

[22] Filed: Mar. 21, 1997

Related U.S. Application Data

[63] Continuation of Ser. No. 537,360, Oct. 2, 1995, abandoned.

[30] Foreign Application Priority Data

Oct. 3, 1994 [JP] Japan ................................. 6-263201
Dec. 22, 1994 [JP] Japan ................................. 6-336221

[51] Int. Cl.$^6$ ............................................. F16H 3/46
[52] U.S. Cl. ......................... 475/281; 475/283; 475/385; 475/289
[58] Field of Search ................................. 475/280, 281, 475/282, 283, 284, 285, 288, 289

[56] References Cited

U.S. PATENT DOCUMENTS

| | | | |
|---|---|---|---|
| 2,886,984 | 5/1959 | Whelpley | 475/280 |
| 3,812,739 | 5/1974 | Mori et al. | 475/285 |
| 3,877,320 | 4/1975 | Iijima | 475/280 |
| 3,999,448 | 12/1976 | Murakami et al. | |
| 4,985,011 | 1/1991 | Asada et al. | 475/285 X |
| 5,030,187 | 7/1991 | Asada | 475/285 X |
| 5,069,656 | 12/1991 | Sherman | |
| 5,131,902 | 7/1992 | Pierce | |
| 5,135,444 | 8/1992 | Hattori | |
| 5,150,634 | 9/1992 | Wakahara | |

FOREIGN PATENT DOCUMENTS

| | | |
|---|---|---|
| 0 421 396 | 4/1991 | European Pat. Off. . |
| 51-6811 | 3/1976 | Japan . |
| 2-129446 | 5/1990 | Japan ............................ 475/280 |
| 3-56746 | 3/1991 | Japan . |
| A-3-56745 | 3/1991 | Japan . |
| A-3-56747 | 3/1991 | Japan . |
| A-4-29653 | 1/1992 | Japan . |
| 4-321851 | 11/1992 | Japan . |
| WO 84/03749 | 9/1984 | WIPO . |

*Primary Examiner*—Charles A. Marmor
*Assistant Examiner*—Sherry Lynn Estremsky
*Attorney, Agent, or Firm*—Oblon, Spivak, McClelland, Maier & Neustadt, P.C.

[57] ABSTRACT

A gear transmission unit for an automatic transmission comprises: a single pinion type first planetary gear unit including a first sun gear, a first ring gear arranged concentrically with the first sun gear, and a first carrier retaining a pinion meshing with both the sun gear and the ring gear; a single pinion type second planetary gear unit including a second sun gear, a second ring gear arranged concentrically with the second sun gear and connected to the first carrier, and a second carrier retaining a pinion meshing with both the second sun gear and the second ring gear and connected to the first ring gear; and a double pinion type third planetary gear unit including a third sun gear connected to the first sun gear, a third ring gear arranged concentrically with the third sun gear, and a third carrier retaining both one pinion meshing with the third sun gear and another pinion meshing with the one pinion and the third ring gear. The first carrier is connected to the third ring gear. An output element is connected to at least either the first carrier or the third ring gear; and a brake fixes the third carrier.

28 Claims, 9 Drawing Sheets

| | CLUTCH | | | BRAKE | | | GEAR RATIO | |
|---|---|---|---|---|---|---|---|---|
| | 61 | 62 | 63 | 71 | 72 | 73 | | |
| 1ST | ○ | | | ○ | | | $(1+f_1)/f_1$ | 3.08 |
| 2ND | ○ | | | | | ○ | $1/f_3$ | 2.13 |
| 3RD | ○ | | | | ○ | | $\dfrac{f_1+f_2+f_1 f_2}{f_1(1+f_2)}$ | 1.56 |
| 4TH | ○ | ○ | | | | | 1 | 1.00 |
| 5TH | | ○ | | | ○ | | $1/(1+f_2)$ | 0.73 |
| 6TH | | ○ | | | | ○ | $\dfrac{f_3-f_1(1-f_3)}{f_3}$ | 0.46 |
| REV | | | ○ | | ○ | | $-1/f_2$ | 2.70 |

|      | CLUTCH | | | | BRAKE | | | OWC | |
|------|----|----|----|----|----|----|----|----|----|
|      | 61 | 62 | 63 | 64 | 71 | 72 | 73 | 65 | 66 |
| 1ST  | ○  |    |    |    |    | ◎  |    | ○  | ○  |
| 2ND  | ○  |    |    |    |    |    | ○  |    |    |
| 3RD  | ○  |    |    | ○  | ◎  |    |    |    | ○  |
| 4TH  | ○  | ○  |    | ○  |    |    |    | ○  |    |
| 5TH  |    | ○  |    | ○  | ○  |    |    |    |    |
| 6TH  |    | ○  |    |    |    |    | ○  |    |    |
| REV  |    |    | ○  |    |    | ○  |    |    |    |

|  | CLUTCH | | | | BRAKE | | | | OWC | | |
|---|---|---|---|---|---|---|---|---|---|---|---|
|  | 62 | 63 | 68 | 70 | 71 | 72 | 73 | 74 | 67 | 69 | 75 |
| 1ST |  |  | ○ | ◎ |  | ◎ |  |  | ○ | ○ |  |
| 2ND |  |  | ○ | ◎ |  |  | ◎ | ○ |  | ○ | ○ |
| 3RD |  |  | ○ | ◎ | ○ |  |  | △ |  | ○ |  |
| 4TH | ○ |  | ○ | ◎ |  |  |  | △ |  | ○ |  |
| 5TH | ○ |  | △ |  | ○ |  |  | △ |  |  |  |
| REV |  | ○ |  |  |  | ○ |  |  |  |  |  |

| | CLUTCH | | | | BRAKE | | | | | OWC | | | |
|---|---|---|---|---|---|---|---|---|---|---|---|---|---|
| | 62 | 63 | 68 | 70 | 71 | 72 | 73 | 74 | 77 | 67 | 69 | 75 | 76 |
| 1ST | | | ○ | ◎ | | ◎ | | | | ○ | ○ | | |
| 2ND | | | ○ | ◎ | | | ◎ | ○ | | | ○ | ○ | |
| 3RD | | | ○ | ◎ | ◎ | | | △ | ○ | | ○ | | ○ |
| 4TH | ○ | | ○ | ◎ | | | | △ | △ | | ○ | | |
| 5TH | ○ | | △ | | ○ | | | △ | △ | | | | |
| REV | | ○ | | | | ○ | | | | | | | |

PRIOR ART

FIG.13

|  | CLUTCH | | | BRAKE | | | OWC |
|---|---|---|---|---|---|---|---|
|  | 91 | 92 | 93 | 94 | 95 | 96 | 97 |
| 1ST |  |  | ○ |  |  | ◎ | ○ |
| 2ND |  |  | ○ |  | ○ |  |  |
| 3RD |  |  | ○ | ○ |  |  |  |
| 4TH |  | ○ | ○ |  |  |  |  |
| 5TH |  | ○ |  |  | ○ |  |  |
| 6TH |  | ○ |  |  |  | ○ |  |
| REV | ○ |  |  |  |  | ○ |  |

GEAR TRANSMISSION UNIT FOR AUTOMATIC TRANSMISSION

This application is a Continuation of application Ser. No. 08/537,360, filed on Oct. 2, 1995, now abandoned.

BACKGROUND OF THE INVENTION

The present invention relates to a gear transmission unit to be used in an automatic transmission mounted on a vehicle.

It is well known in the art that a plurality of sets of planetary gear units are used in the gear transmission unit of the vehicular automatic transmission. The number of gear stages to be set and the gear ratios can be changed in various manners depending upon how to use the planetary gear units or by changing the number of the planetary gear units and/or the connecting relations of individual rotary elements. Depending upon their arrangement, moreover, the length and/or external diameter of the entirety of the gear transmission unit is increased or decreased.

The automatic transmission or the gear transmission unit to be used in the former is basically desired to have a small size and a low weight. In case two sets of single pinion type planetary gear units are used, for example, the prior art has frequently used the so-called "CR—CR" coupling construction, in which the carriers and ring gears of the planetary gear units are mutually connected. This is because of the advantages that the planetary gear units can be arranged close to each other and that the four forward gear stages can be set to have practical gear ratios. In order to improve the power performance of the vehicle as a whole, on the other hand, it may be desired for the automatic transmission to set more gear stages. In the invention disclosed in Japanese Patent Laid-Open No. 56746/1991, for example, a double pinion type third planetary gear unit is added to the two sets of single pinion type planetary gear units having the "CR—CR" coupling, so that six forward and two reverse gear stages may be set as a whole.

Figure 18:
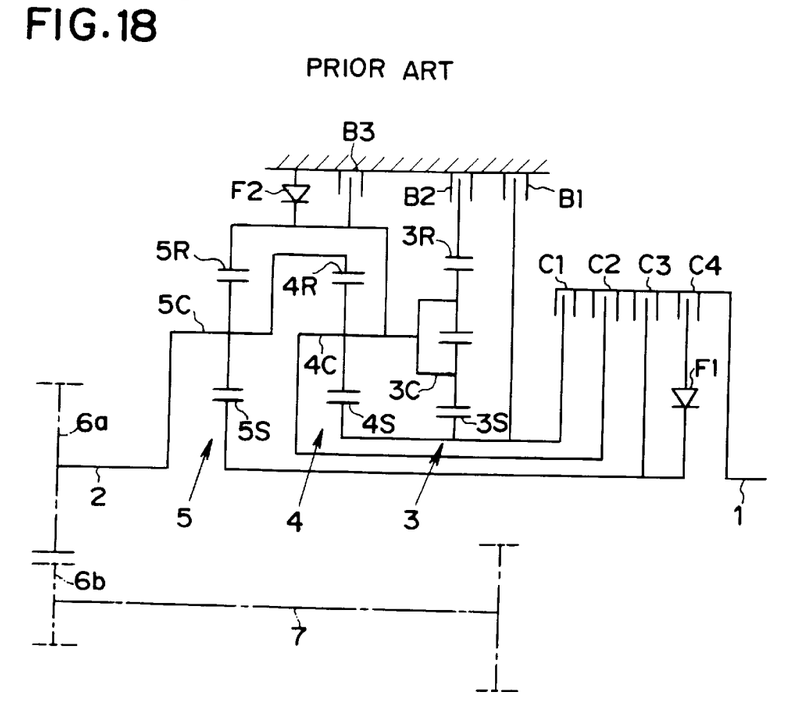
FIG. 18 is a skeleton diagram showing one example of a gear transmission unit of the prior art capable of set six forward and one reverse gear stages.

This construction will be briefly described in the following. As shown in FIG. 18, an input shaft 1 and an output shaft 2 are arranged on a common axis, and a double pinion type planetary gear unit 3 and single pinion type planetary gear units 4 and 5 are arranged between the input shaft 1 and the output shaft 2 and on a common axis in the recited sequence, as taken from the side of the input shaft 1. These planetary gear units are so connected that their three components, i.e., the carrier 3C of the first planetary gear unit 3, the carrier 4C of the second planetary gear unit 4 and the ring gear 5R of the third planetary gear unit 5 may rotate altogether. Moreover, the first planetary gear unit 3 and the second planetary gear unit 4 are so connected that their sun gears 3S and 4S may rotate together. Still moreover, the second planetary gear unit 4 and the third planetary gear unit 5 are so connected that their ring gear 4R and carrier 5C may rotate together and that the output shaft 2 is connected to the carrier 5C. This output shaft 2 is further connected through a pair of counter gears 6a and 6b to a counter shaft 7.

In order to connect the input shaft 1 to the predetermined rotary elements, there are provided a plurality of clutches: a first clutch C1 interposed between the input shaft 1 and the sun gear 3S of the first planetary gear unit 3; a second clutch C2 interposed between the input shaft 1 and the carrier 4C of the second planetary gear unit 4; and a third clutch C3 interposed between the input shaft 1 and the sun gear 5S of the third planetary gear unit 5. Moreover, a fourth clutch C4 and a first one-way clutch F1 are connected in series with each other and in parallel with the third clutch C3.

In order to fix the predetermined rotary elements, there are provided brake means: a first brake B1 for fixing the sun gear 3S of the first planetary gear unit 3 and the sun gear 4S of the second planetary gear unit 4, as united with each other; a second brake B2 for fixing the ring gear 3R of the first planetary gear unit 3; and a third brake B3 for fixing the mutually united components, i.e., the carrier 3C of the first planetary gear unit 3, the carrier 4C of the second planetary gear unit 4 and the ring gear 5R of the third planetary gear unit 5. Moreover, a second one-way clutch F2 is arranged in parallel with the third brake B3.

According to the gear transmission unit of the prior art described above, therefore, the six forward and two reverse gear stages can be set by applying/releasing the individual clutches and brakes properly, thereby to improve the power performance and the fuel economy by the multiple stages.

Incidentally, the gear ratios to be set by the gear transmission unit using a plurality of sets of planetary gear units are determined by the gear ratios (i.e., the ratios between the tooth number of the sun gears and the tooth number of the ring gears) of the planetary gear units participating in the shift. Generally speaking, the gear ratios are desired to take a relation similar to the geometric series so as to improve the power performance of the vehicle as a whole and to facilitate the shift controls. On the other hand, the gear ratios in the planetary gear units are restricted by the difference between the internal and external diameters to be produced and the external diameters to be allowed.

However, if the aforementioned gear transmission unit of the prior art has its individual six forward gear stages set to have their gear ratios practically similar to the relation of the geometric series, any of the gear ratios of the individual planetary gear units to be determined on the basis of the relation will take such a small value as cannot be usually employed. In order to reduce the gear ratio of the planetary gear unit, it is necessary to give the sun gear a smaller diameter or the ring gear a larger diameter. However, the internal diameter of the sun gear cannot be reduced more than a predetermined value because a rotating shaft such as the input shaft or an intermediate shaft is arranged in the inner circumference of the sun gear. Thus, it is the current practice that the ring gear has to be radially enlarged so as to reduce the gear ratio. Thus, the aforementioned gear transmission unit of the prior art is disadvantageous in that any of the gear transmission units is radially enlarged to enlarge the entire size of the gear transmission unit if a proper gear ratio is desired.

In order to avoid this disadvantage, it is conceived to use the planetary gear unit which has its external diameter reduced to have a gear ratio similar to the ordinary one. If this planetary gear unit is used, the gear ratio at a gear stage will seriously deviate from the estimated value, that is, the step width (i.e., the ratio between the gear ratios) of the gear ratio will seriously deviate from another step width between the gear stages. As a result, the shifting shock may increase to make the shift control difficult.

On the other hand, the forward sixth speed in the aforementioned gear transmission unit is the so-called "overdrive stage" having a gear ratio smaller than "1" and is set by applying not only the third clutch C3 and the third brake B3. In other words, the three components, i.e., the carrier 3C of the first planetary gear unit 3, the carrier 4C of the second planetary gear unit 4 and the ring gear 5R of the third planetary gear unit 5 are rotated at the same speed as that of the input shaft 1. In the first planetary gear unit 3, on the contrary, the ring gear 3R is fixed, and the sun gear 3S rotates (backward) in the opposite direction to the input shaft 1 so that the sun gear 4S, as united with the sun gear 3S, of the second planetary gear unit 4 likewise rotates backward. In the second planetary gear unit 4, therefore, the carrier 4C rotates together with the input shaft 1 while the sun gear 4S rotating backward. As a result, the ring gear 4R, as united with the output element, rotates forward faster than the carrier 4C, i.e., the input shaft 1 thereby to establish the overdrive gear stage.

In this case, the third planetary gear unit 5 takes no special participation in the shift, but the ring gear 5R rotates together with the input shaft 1, and the carrier 5C rotates forward together with the carrier 4C of the second planetary gear unit 4 faster than the input shaft 1. As a result, the sun gear 5S of the third planetary gear unit 5 rotates forward faster than the carrier 5C so that its R.P.M. is far higher than that of the input shaft 1.

Specifically, the aforementioned gear transmission unit of the prior art is enabled to set the multiple stages by using the three sets of planetary gear units. At the overdrive gear stage frequently used, however, the R.P.M. of the sun gear 5S of the third planetary gear unit 5 rises so extremely that a bearing member such as a bush supporting it has its durability lowered or that it grows necessary to increase the flow of the lubricating oil to the one-way clutch F1 connected to the sun gear 5S thereby to increase the pump capacity. Another problem is that the power loss and/or the oil temperature rise is caused due to the agitation of the lubricating oil by the clutch C3 connected to the sun gear 5S.

SUMMARY OF THE INVENTION

A main object of the present invention is to provide a gear transmission unit which has its size and weight reduced by making use of the advantage of the "CR—CR" coupling and which can reduce the shifting shock and improve the power performance.

Another object of the present invention is to provide a gear transmission unit which can set six forward gear stages while preventing the predetermined rotary elements from any excessive rotation.

The gear transmission unit according to the present invention is constructed to comprise two sets of single pinion type planetary gear units and a double pinion type planetary gear unit having their carriers and ring gears connected always or selectively to each other. The sun gear of the first single pinion type planetary gear unit and the sun gear of the double pinion type planetary gear unit are connected to each other, and the carrier of the first single pinion type planetary gear unit and the ring gear of the double pinion type planetary gear unit are connected to each other. Moreover, the output element is connected to that ring gear, and a brake is provided for fixing the carrier of the double pinion type planetary gear unit selectively.

As a result, even if the gear ratios of the individual gear transmission units are set within the generally used gear ratio range, the step widths of the gear ratios at the individual gear stages take similar values. According to the present invention, therefore, it is possible to provide a small-sized light gear transmission unit which can have little shifting shock and facilitate the shift controls.

According to the present invention, moreover, the gear train is constructed mainly of two sets of single pinion type planetary gear units and one set of double pinion type planetary gear unit such that the ring gear of the first single pinion type planetary gear unit and the carrier of the second single pinion type planetary gear unit are connected and such that the carrier of the first single pinion type planetary gear unit and the ring gear of the second single pinion type planetary gear unit are connected to each other through a clutch. The sun gear of the first single pinion type planetary gear unit and the sun gear of the double pinion type planetary gear unit are connected to each other, and there is provided clutch means for connecting the input shaft selectively to those sun gears. Moreover, the carrier of the double pinion type planetary gear unit is connected to the carrier of the first single pinion type planetary gear unit. Still moreover, the sun gear of the second single pinion type planetary gear unit is always connected to the input element. There are provided clutch means for connecting the input element to the carrier of the first single pinion type planetary gear unit, and brake means for fixing the ring gear of the double pinion type planetary gear unit.

Thus, it is possible to provide a gear transmission unit which can prevent any excessive rotation of the rotary elements although it can set the six forward gear stages and which have practically excellent effects that the durability is improved and that the power loss due to the oil agitation is prevented in advance.

The above and further objects and novel features of the present invention will more fully appear from the following detailed description when the same is read with reference to the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
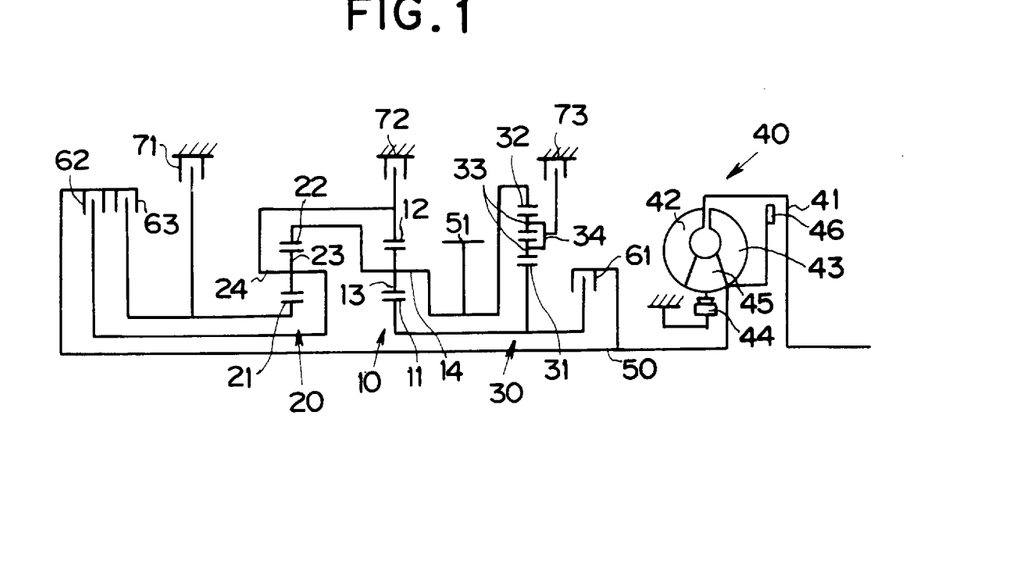
FIG. 1 is a skeleton diagram showing one embodiment of the present invention.

The present invention will be described in more detail in connection with its embodiments. In FIG. 1, a first planetary gear unit 10 and a second planetary gear unit 20 both of single pinion type are arranged on a common axis and adjacent to each other, and a third planetary gear unit 30 of double pinion type is arranged on the same axis as that of the first and second planetary gear units 10 and 20. These planetary gear units 10, 20 and 30 are arrayed in the sequence of 30, 10 and 20 from the side of a torque converter 40 with a lockup clutch.

This torque converter 40 will be described in the following. A pump impeller 42, as united with a front cover 41, is confronted by a turbine runner 43, to which is connected an input shaft 50. Between the inner circumferences of the pump impeller 42 and the turbine runner 43, there is arranged a stator 45 which is supported by a one-way clutch 44. A lockup clutch 46 to come into selective engagement with the inner face of the front cover 41 is united with the turbine runner 43.

The first planetary gear unit 10 has major rotary components: a sun gear 11; a ring gear 12 arranged concentrically with the sun gear 11; and a carrier 14 rotatably retaining a pinion 13 meshing with those sun gear 11 and ring gear 12. On the other hand, the second planetary gear unit 20 likewise has major components: a sun gear 21; a ring gear 22 arranged concentrically with the sun gear 21; and a carrier 24 rotatably retaining a pinion 23 meshing with those sun gear 21 and ring gear 22. Moreover, the carrier 14 of the first planetary gear unit 10 and the ring gear 22 of the second planetary gear unit 20 are connected to each other, and the ring gear 12 of the first planetary gear unit 10 and the carrier 24 of the second planetary gear unit 20 are connected to each other, so that these first and second planetary gear units 10 and 20 constitute together a main transmission unit.

On the other hand, the third planetary gear unit 30 has major rotary components: a sun gear 31; a ring gear 32; and a carrier 34 for rotatably retaining at least a pair of pinions 33 arranged between those gears 31 and 32. The ring gear 32 is connected to the carrier 14 of the first planetary gear unit 10, and these ring gear 32 and carrier 14 are connected to an output gear (or counter gear) 51 acting as an output element. Moreover, the sun gear 31 is connected to the sun gear 11 of the first planetary gear unit 10.

Here will be described the clutch means and the brake means. The input shaft 50, to which is transmitted the power from the turbine runner 43 of the torque converter 40, is arranged along the center axis of the individual planetary gear units 10, 20 and 30. A first clutch 61 or a multi-disc clutch is arranged between the input shaft 50 and the sun gear 31 of the third planetary gear unit 30, and a second clutch 62 or a multi-disc clutch is arranged between the input shaft 50 and the carrier 24 of the second planetary gear unit 20. Moreover, a third clutch 63 or a multi-disc clutch is arranged between the input shaft 50 and the sun gear 11 of the first planetary gear unit 10.

The brake means includes: a first brake 71 for selectively fixing the sun gear 21 of the second planetary gear unit 20; a second brake 72 for selectively fixing the ring gear 12 of the first planetary gear unit 10 and the carrier 24 of the secondary planetary gear unit 20; and a third brake 73 for selectively fixing the carrier 34 of the third planetary gear unit 30.

Figure 2:
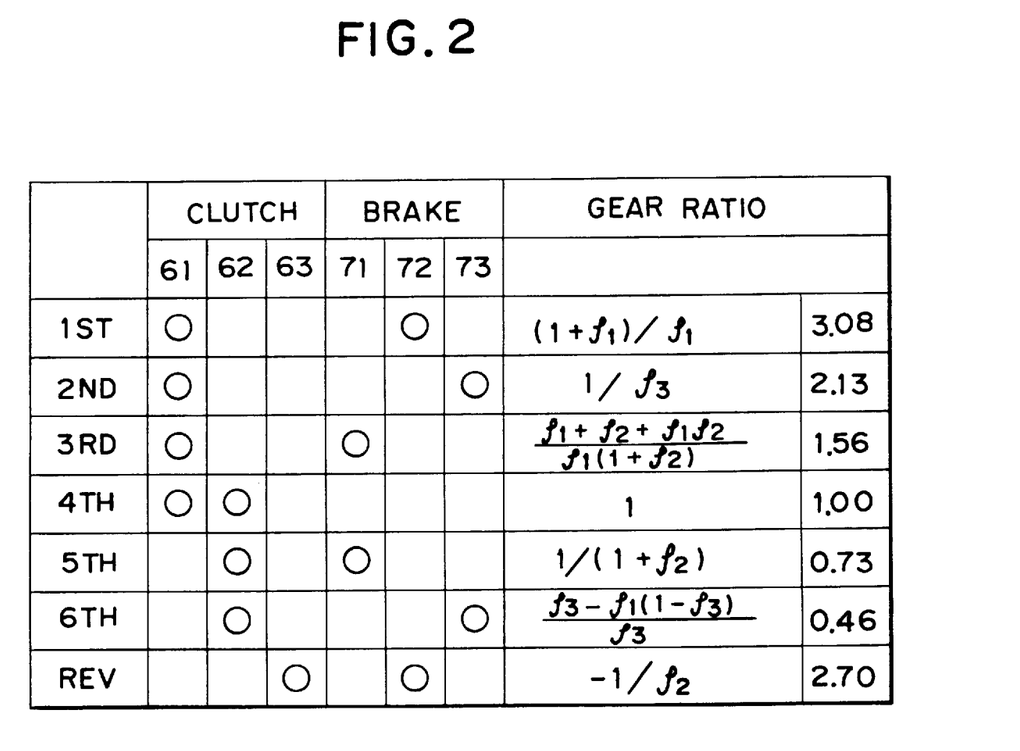
FIG. 2 is a table showing the clutch/brake application chart of the embodiment.
Figure 3:
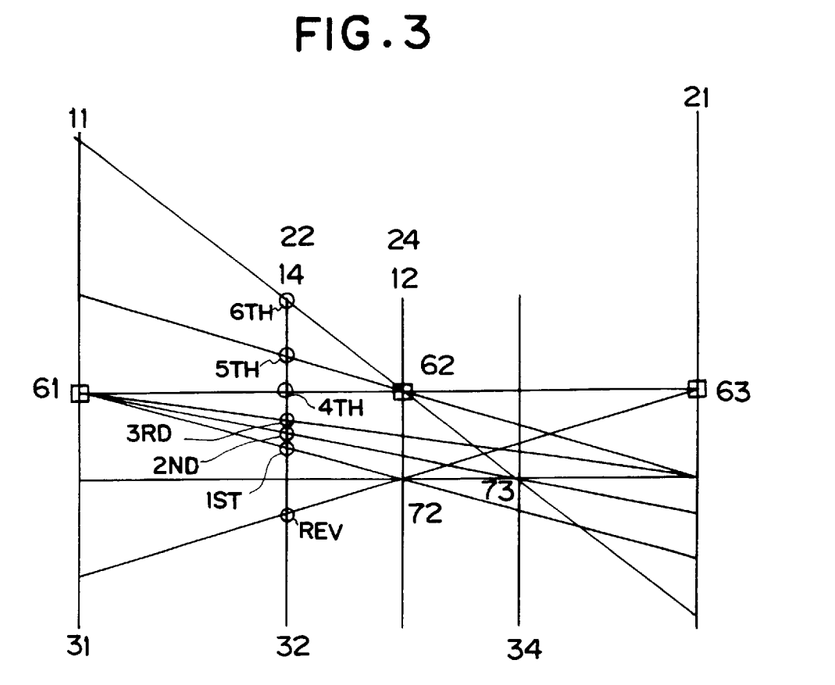
FIG. 3 is a rotational speed diagram for describing rotary speeds of the rotational elements at each gear stage.

In the gear transmission unit described above, the six forward and one reverse gear stages can be set by applying the aforementioned clutches and brakes, as tabulated in FIG. 2. In FIG. 2, symbols ○ indicate the applied states, and blanks indicate the released states. In FIG. 2, moreover, the gear ratios take their specific values for the planetary gear unit 10 having a gear ratio $\rho_1$ of 0.48, the second planetary gear unit 20 having a gear ratio $\rho_2$ of 0.37 and the third planetary gear unit 30 having a gear ratio $\rho_3$ of 0.47. Moreover, a rotational speed diagram of the gear transmission unit having the construction shown in FIG. 1 is illustrated in FIG. 3. Here will be briefly described the individual gear stages.

The forward first speed is set by applying the first clutch 61 and the second brake 72. Specifically, the first speed is set by inputting the power to the first sun gear 11 and by fixing the ring gear 12. In the first planetary gear unit 10, therefore, the sun gear 11 is rotated together with the input shaft 50 while the ring gear 12 being fixed, so that the carrier 14 and the output gear 51 united with the former are highly decelerated with respect to the input shaft 50 to rotate forward (i.e., in the same direction as that of the input shaft 50), thus establishing the first speed that has the highest gear ratio in the forward stages. As a result, this first speed is set exclusively by the first planetary gear unit 10 of the main transmission unit.

The second speed is set from the aforementioned state of the first speed by applying the third brake 73 in place of the second brake 72. Specifically, the power is inputted to the sun gear 31 of the third planetary gear unit 30, and the carrier 34 of the third planetary gear unit 30 is fixed. In this third planetary gear unit 30, therefore, the sun gear 31 rotates together with the input shaft 50 with the carrier 34 being fixed, so that the ring gear 32 and the united output gear 51 are decelerated at the gear ratio $\rho_3$ of the third planetary gear unit 30 to rotate forward, thus establishing the second speed having a slightly smaller gear ratio than that of the first speed. In short, this second speed is set exclusively by the third planetary gear unit 30.

The third speed is set from the state of the second speed by applying the first brake 71 in place of the third brake 73. Specifically, the power is inputted to the sun gear 11 of the first planetary gear unit 10, and the sun gear 21 of the second planetary gear unit 20 is fixed. In the first planetary gear unit 10, therefore, the load from the output gear 51 is applied to the carrier 14 so that the ring gear 12 will rotate backward (i.e., in the opposite direction of the input shaft 50). In the second planetary gear unit 20, accordingly, the carrier 24 will rotate backward to rotate the sun gear 21 backward with the load of the output gear 51 being applied to the ring gear 22. However, since the sun gear 21 is fixed by the first brake 71, the carrier 24 rotates forward, and the ring gear 22 and the united output gear 51 rotate forward at a higher speed than that of the first speed. In short, the third speed is set. As a result, this third speed is set exclusively by the main transmission unit.

The fourth speed is set by applying the first clutch 61 and the second clutch 62. In the first planetary gear unit 10, therefore, the sun gear 11 and the ring gear 12 are rotated together with the input shaft 50 so that they rotate altogether to rotate the output gear 51 and the input shaft 50 at an equal speed. In other words, here is established the fourth speed or the directly connected gear stage. In this case, too, the fourth speed is set exclusively by the main transmission unit.

The fifth speed is set by applying the second clutch 62 and the first brake 71. Specifically, the power is inputted to the carrier 24 of the second planetary gear unit 20, and the sun gear 21 is fixed. As a result, the carrier 24 and the output gear 51 connected to the former are rotated at a higher speed than the carrier 24 and the input shaft 50, thus establishing the fifth speed or the overdrive gear stage. Thus, the fifth speed is also set exclusively by the main transmission unit.

The sixth speed is set from the state of the fifth speed by applying the third brake 73 in place of the first brake 71. In the state of the fifth speed, in the third planetary gear unit 30, the ring gear 32 rotates forward at a high speed together with the output gear 51 so that the sun gear 31 rotates forward at a higher speed, whereas the carrier 34 rotates forward at a lower speed than the input shaft 50. Therefore, if the carrier is fixed from this state by the third brake 73, the ring gear 32 and the sun gear 31 are further accelerated to set the sixth speed or the second overdrive gear stage.

Here will be described the reverse stage. This reverse stage is set by applying the third clutch 63 and the second brake 72. Specifically, the sun gear 21 in the second planetary gear unit 20 is connected to the input shaft 50, and the carrier 24 is fixed. As a result, the ring gear 22 and the united output gear 51 are reversed from the input shaft 50 to establish the reverse stage.

Figure 4:
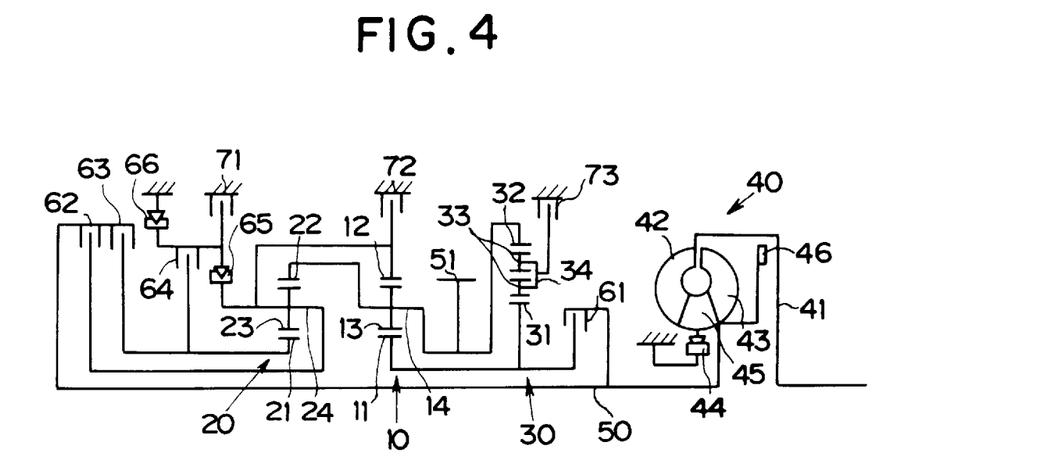
FIG. 4 is a skeleton diagram showing another embodiment to which is added a one-way clutch.

In the gear transmission unit shown in FIG. 1, too, a one-way clutch can be appropriately added so as to facilitate the shift control, as exemplified in FIG. 4. Specifically, a fourth clutch 64 is arranged in series with the first brake 71, and a first one-way clutch 65 is arranged in series between the first brake 71 and the carrier 24 of the second planetary gear unit 20. Moreover, a second one-way clutch 66 is arranged in parallel with the first brake 71. In other words, the first one-way clutch 65 and the second one-way clutch 66 are arranged in series between the carrier 24 of the second planetary gear unit 20 and a predetermined stationary portion.

Figure 5:
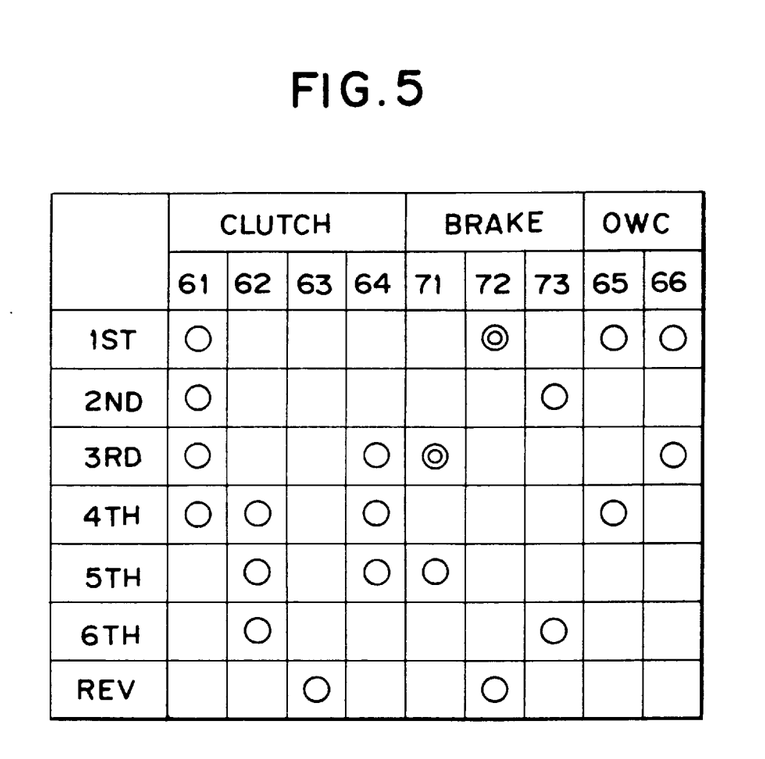
FIG. 5 is a table showing the clutch/brake application chart of the embodiment.

The clutch/brake application chart of the gear transmission unit shown in FIG. 4 is tabulated in FIG. 5. Incidentally, symbols ⊚ appearing in FIG. 5 indicate the application at the engine braking time. As described before, the first speed is set by fixing the ring gear 12 of the first planetary gear unit 10 and the carrier 24, as united with the former, of the second planetary gear unit 20. In the construction shown in FIG. 4, the first one-way clutch 65 and the second one-way clutch 66 are applied to fix the ring gear 12 and the carrier 24. At the engine braking time, the second brake 72 or the multi-disc brake having no directivity in the torque transmission is applied. On the other hand, the third speed is set by fixing the sun gear 21 of the second planetary gear unit 20. This sun gear 21 is fixed by applying the fourth clutch 64 and accordingly the second one-way clutch 66. In this case, if the direction of the torque to act upon the second one-way clutch 66 is reversed, this one-way clutch 66 will be released. At the engine braking time, therefore, the first brake 71 having a parallel relation to the second one-way clutch 66 is applied. Moreover, the fourth speed may be set by applying the first clutch 61 and the second clutch 62 to rotate the first planetary gear unit 10 in its entirety. As the fourth clutch 64 is applied in this state, the second planetary gear unit 20 is rotated in its entirety to transmit the torque from the ring gear 22 to the output gear 51. As a result, the torque to be applied to the first planetary gear unit 10 can be reduced. Incidentally, the remaining gear stages can be set as in the gear transmission unit shown in FIG. 1.

Figure 6:
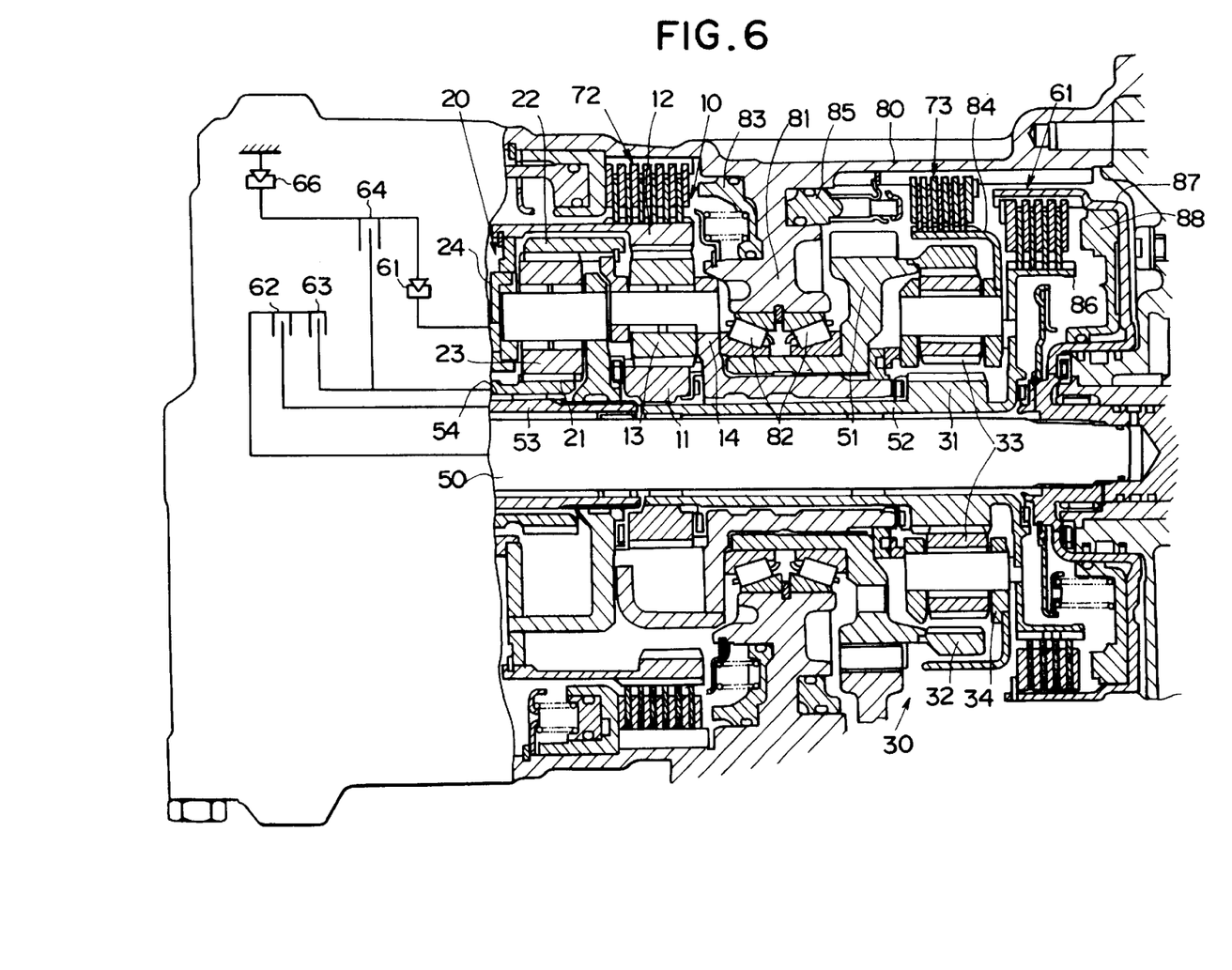
FIG. 6 is a section showing a portion of a gear transmission unit of FIG. 4 more specifically.

One specified example of the gear transmission unit of FIG. 4 is shown in FIG. 6. In FIG. 6, from an axially central portion of the casing 80, there is projected toward the center an annular center support portion 81 which divides the inside of the casing 80 into right and left halves. The main transmission unit is arranged at the left side of FIG. 6 (i.e., at the opposite side of the torque converter 40) with respect to this center support portion 81, and the output gear 51 and the third planetary gear unit 30 are arranged at the right side (i.e., at the side of the torque converter 40) of the center support portion 81. In other words, the first planetary gear unit 10 is arranged adjacent to the left side of the center support portion 81, and the second planetary gear unit 20 is arranged adjacent thereto. The ring gear 12 of the first planetary gear unit 10 has its cylindrical portion extended around the second planetary gear unit 20 so that its leading end portion is so connected to the carrier 24 of the second planetary gear unit 20 as to rotate together. On the other hand, the ring gear 22 of the second planetary gear unit 20 is disposed in the inner circumference of the cylindrical portion of the ring gear 12 of the first planetary gear unit 10 so that its end portion is so connected to the carrier 14 of the first planetary gear unit 10 as to rotate together.

Around the outer circumference of the input shaft (or intermediate shaft) 50 arranged on the center axis, there are rotatably arranged a sun gear shaft 52 and a first connecting shaft 53. This first connecting shaft 53 is arranged at the left side of FIG. 6 (i.e., at the side of the shift end portion) of the sun gear shaft 52 and has its one end portion splined by the carrier 24 of the second planetary gear unit 20 and its other end portion connected to the second clutch 62. Around the outer circumference of this first connecting shaft 53, moreover, there is rotatably arranged a second connecting shaft 54 which has its one end portion formed with the sun gear 21 of the second planetary gear unit 20 and its other end portion connected to the third clutch 63 and the fourth clutch 64.

The aforementioned sun gear shaft 52 has its one end portion formed with the sun gear 31 of the third planetary gear unit 30 and its other end portion splined by the sun gear 11 of the first planetary gear unit 10. On the outer circumference of the sun gear shaft 52, there is rotatably fitted the cylindrical shaft portion of the carrier 14 of the first planetary gear unit 10, and the cylindrical shaft portion of the output gear 51 is splined to the outer circumference of the cylindrical shaft portion of the carrier 14. Moreover, these cylindrical shaft portions of the output gear 51 and the carrier 14 are rotatably supported by a pair of taper roller bearings 82 which are arranged in the inner circumference of the aforementioned center support portion 81.

To the outer circumference of the ring gear 12 of the first planetary gear unit 10, there are splined a plurality of friction plates, alternately of which are arranged other friction plates splined to the inner circumference of the casing 80, thereby to form the second brake 72. A piston 83 for pushing the friction plates of the second brake 72 is reciprocally fitted in a cylinder portion which is formed in the side face of the center support portion 81. To the carrier 34 of the third planetary gear unit 30, on the other hand, there are integrally connected a cylindrical brake hub 84. To the outer circumference of this brake hub 84, there are splined a plurality of friction plates, alternately of which are arranged other friction plates splined to the inner circumference of the casing 80, thereby to form the third brake 73. A piston 85 for pushing the friction plates of the third brake 73 is reciprocally fitted in the cylinder portion which is formed in the side face of the center support portion 81.

Moreover, the end portion of the sun gear 52, as located at the side of the torque converter, is extended radially outward to form a clutch hub 86, and a clutch drum 87 arranged concentrically with the clutch hub 86 is splined to the aforementioned input shaft 50. One of the two groups of friction plates, as alternately arranged in the axial direction, is splined to the outer circumference of the clutch hub 86 whereas the other group is splined to the inner circumference of the clutch drum 87, thereby to form the first clutch 61. A piston 88 for pushing the friction plates in the first clutch 61 is reciprocally fitted in the cylinder portion which is formed in the clutch drum 87.

Figure 7:
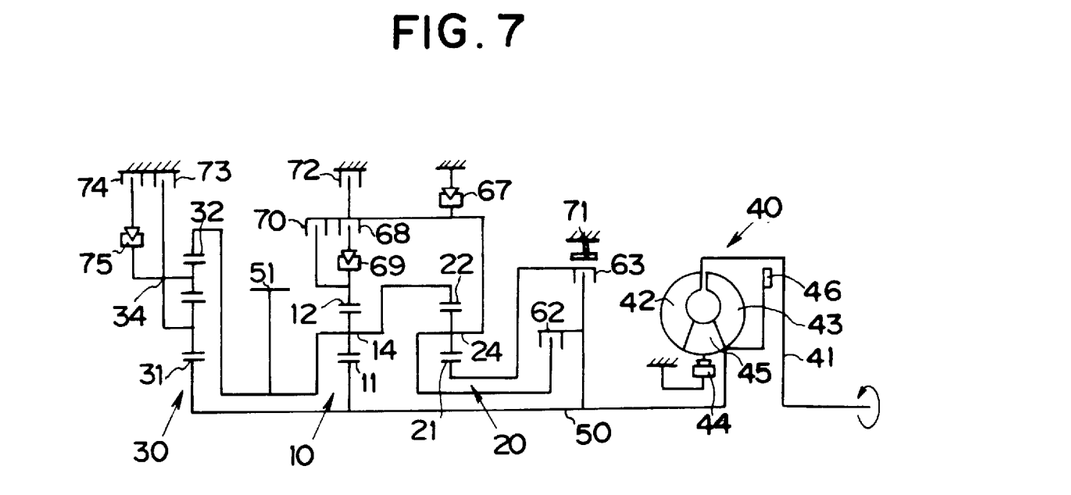
FIG. 7 is a skeleton diagram showing an example which is constructed to selectively release the connection between the ring gear of a first planetary gear unit and the carrier of a second planetary gear unit.

FIG. 7 shows a gear transmission unit which is so constructed by improving the gear transmission unit of FIG. 1 to change the arrangement of the individual planetary gear units 10, 20 and 30 that the one-way clutch may acts at a shift between adjoining gear stages. Specifically, the second planetary gear unit 20, the first planetary gear unit 10 and the third planetary gear unit 30 are arranged in the recited sequence from the side of the torque converter 40. A one-way clutch 67 is arranged in parallel with the second brake 72 for fixing the carrier 24 of the second planetary gear unit 20 selectively, and a fifth clutch 68 or a multi-disc clutch and a one-way clutch 69 are arranged in series between the carrier 24 and the ring gear 12 of the first planetary gear unit 10. A sixth clutch 70 or a multi-disc clutch is arranged in parallel with those fifth clutch 68 and one-way clutch 69. Moreover, a fourth brake 74 or a multi-disc brake and a one-way clutch 75 are arranged in series with each other and in parallel to the third brake 73 for fixing the carrier 34 of the third planetary gear unit 30 selectively. The sun gear 11 of the first planetary gear unit 10 and the sun gear 31 of the third planetary gear unit 30 are connected directly to the input shaft 50. The remaining construction is similar to that shown in FIG. 1, and its description will be omitted by designating the corresponding parts of FIG. 7 at the common reference numerals.

Figure 8:
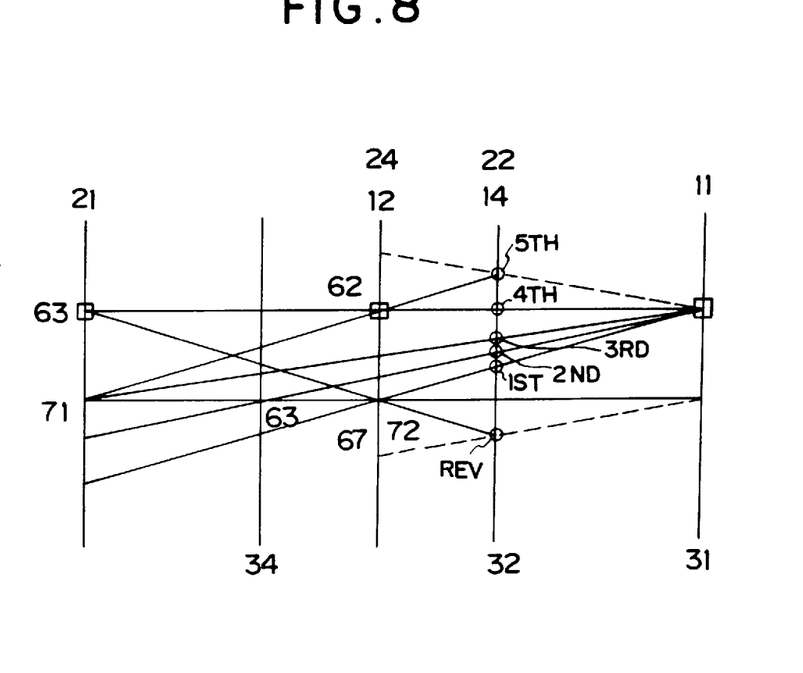
FIG. 8 is a rotational speed diagram of the gear transmission unit shown in FIG. 7.
Figure 9:
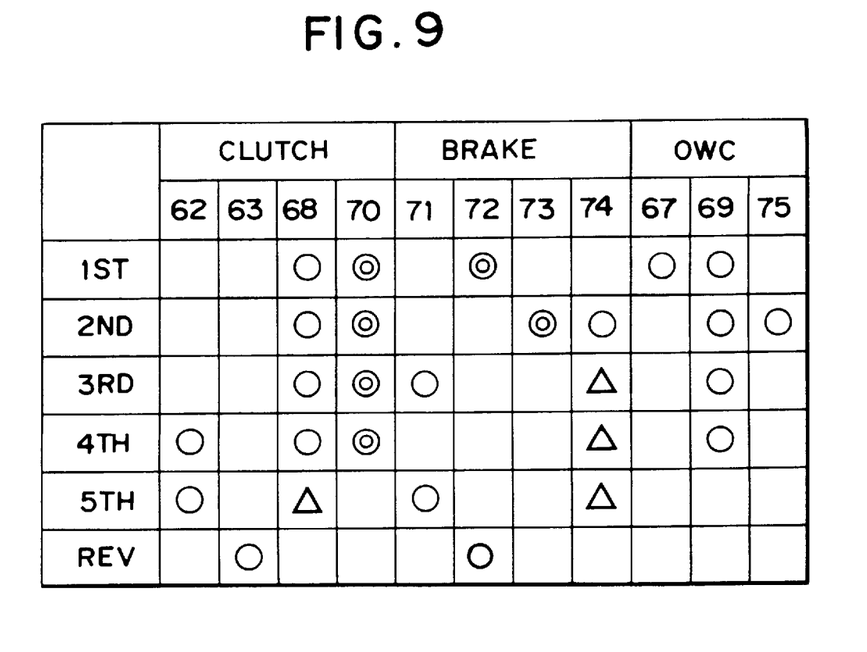
FIG. 9 is a table showing the clutch/brake application chart of the gear transmission unit.

The gear transmission units shown in FIG. 7 can set five forward and one reverse gear stages and has its rotational speed diagram illustrated in FIG. 8 and its clutch/brake application chart tabulated in FIG. 9. Incidentally, symbols Δ appearing in FIG. 9 indicate that the corresponding components take no participation into the torque transmission even if applied.

As could be seen from these Figures, the forward first speed is set by applying the fifth clutch 68 and accordingly the one-way clutch 69 in series with the former. Then, the "CR—CR" coupling is established between the first planetary gear unit 10 and the second planetary gear unit 20. In this state, the third one-way clutch 67 is applied to fix the ring gear 12 of the first planetary gear unit 10 and the carrier 24 of the second planetary gear unit 20. In the first planetary gear unit 10, the sun gear 11 is rotated as an input element with the ring gear 12 being fixed, so that the first speed is set as in the aforementioned gear transmission unit shown in FIG. 1.

As the fourth brake 74 is applied from this state of the first speed, the fifth one-way clutch 75 arranged in series with the former is applied to fix the carrier 34 of the third planetary gear unit 30. Accordingly, the ring gear 12 of the first planetary gear unit 10 and the carrier 24 of the second planetary gear unit 20 rotate forward to release the third one-way clutch 67 having fixed them. In this state, too, the fourth one-way clutch 69 is applied to keep the "CR—CR" coupling between the first planetary gear unit 10 and the second planetary gear unit 20. In the third planetary gear unit 30, therefore, the sun gear 31 rotates as the input element with the carrier 34 being fixed, so that the forward second speed is achieved as in the aforementioned gear transmission unit shown in FIG. 1. In short, the upshift from the first speed to the second speed is achieved by applying the fourth brake 74.

The third speed is achieved from the state of the second speed by applying the first brake 71 to fix the sun gear 21 of the second planetary gear unit 20. In this case, too, the "CR—CR" coupling holds between the first planetary gear unit 10 and the second planetary gear unit 20, and the carrier 34 of the third planetary gear unit 30 is started to rotate forward by applying the first brake 71, so that the one-way clutch 75 having fixed the carrier 34 is released. As a result, there hold the states in which the sun gear 11 of the first planetary gear unit 10 acts as the input element and in which the sun gear 21 of the second planetary gear unit 20 is fixed, so that the forward third speed is set as in the aforementioned gear transmission unit shown in FIG. 1.

The fourth speed is the so-called "directly connected stage" and is set from the state of the third speed by releasing the first brake 71 and by applying the second clutch 62. In this case, too, the "CR—CR" coupling holds between the first planetary gear unit 10 and the second planetary gear unit 20 so that the sun gear 11 and the ring gear 12 in the first planetary gear unit 10 are connected to the input shaft 50. As a result, the individual planetary gear units 10, 20 and 30 rotate altogether with the input shaft 50 to establish the directly connected stage.

The forward fifth speed is set by applying the first brake 71 in the state of the fourth speed. In the second planetary gear unit 20, therefore, the carrier 24 rotates as the input element together with the input shaft 50 with the sun gear 21 being fixed, so that the ring gear 22 is accelerated to rotate forward faster than the input shaft 50. Since the ring gear 22 is connected to the carrier 14 of the first planetary gear unit 10, the sun gear 11 of the first planetary gear unit 10 rotates together with the input shaft 50, and the carrier 14 is accelerated to rotate faster than the input shaft 50, so that the ring gear 12 rotates forward faster than the carrier 24. As a result, the fourth one-way clutch 69 is released to disconnect the ring gear 12 and the carrier 24. As a result, the output gear 51, as connected to the carrier 14 of the first planetary gear unit 10 and the ring gear 22 of the second planetary gear unit 20, is accelerated to rotate forward faster than the input shaft 50, thereby to set the fifth speed or the overdrive gear stage.

The reverse gear stage is set by applying the third clutch 63 and the second brake 72. In the second planetary gear unit 20, therefore, the sun gear 21 is rotated together with the input shaft 50 with the carrier 24 being fixed, so that the ring gear 22 and the output gear 51 connected to the former are rotated in the opposite direction of the input shaft 50, thereby to set the reverse stage. In this case, the ring gear 12 of the first planetary gear unit 10 is rotated backward faster than the output gear 51, but the fifth clutch 68 is released to disconnect it from the second planetary gear unit 20.

Figure 10:
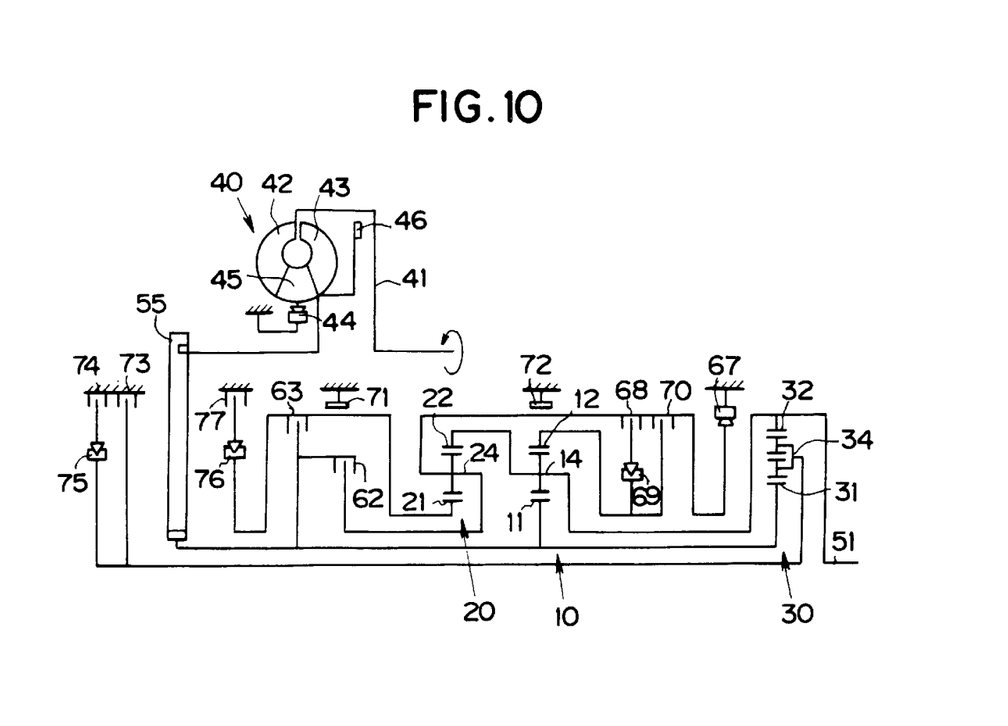
FIG. 10 is a skeleton diagram showing an example which is constructed to apply a one-way clutch in all the shifts between adjoining gear stages.

In the aforementioned gear transmission unit shown in FIG. 7, at the shift between the third speed and the fourth speed, both the applied/released states of the second clutch 62 and the first brake 71 have to be changed. This necessity can be eliminated in a construction, as exemplified in FIG. 10. Specifically, the example shown in FIG. 10 is modified to suit to the so-called "FR (i.e., front-engine and rear-drive) car" such that a fifth brake 77 or a multi-disc brake and a one-way clutch 76 arranged in series with the former are arranged together in parallel with the first brake 71. As a result, the torque converter 40 is arranged on an axis parallel with the center axis of the individual planetary gear units 10, 20 and 30 and has its turbine runner and input shaft 50 connected to each other through a transmission mechanism 55 such as silent chain. The remaining construction is similar to that of the gear transmission unit shown in FIG. 7, and its description will be omitted by designating the corresponding components of FIG. 10 at the common reference numerals of FIG. 7.

Figure 11:
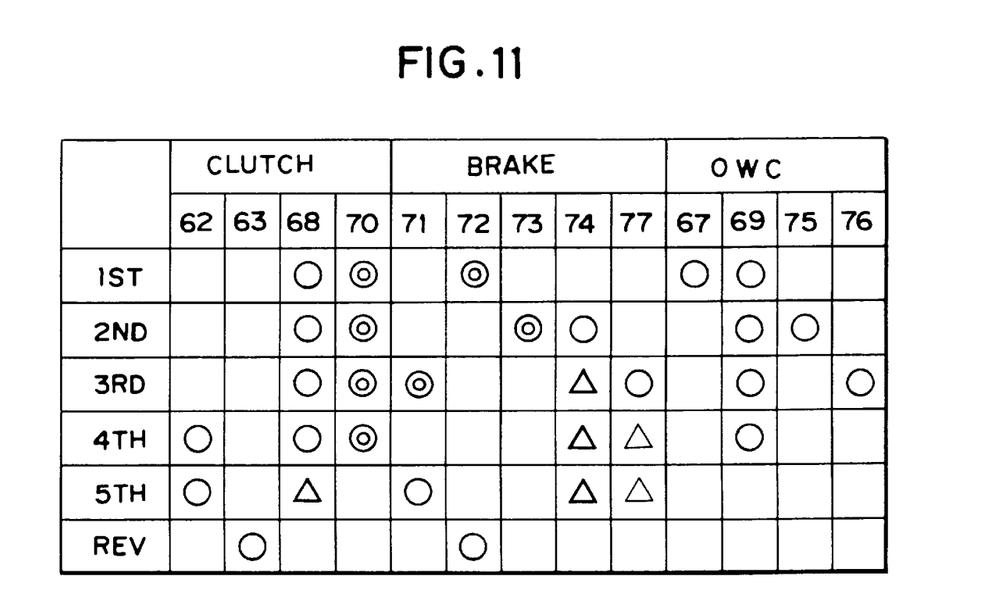
FIG. 11 is a table showing the clutch/brake application chart of the example.

The rotational speed diagram of this gear transmission unit shown in FIG. 10 is similar to that of FIG. 8, and the clutch/brake application chart is presented in FIG. 11. In the gear transmission unit of FIG. 10, as seen from FIG. 11, the fifth brake 77 and the one-way clutch 76 are arranged in parallel with the first brake 71. In case the third speed is to be set, therefore, the one-way clutch 76 can be applied, if in the power ON state, to fix the sun gear 21 of the second planetary gear unit 20 as the fifth brake 77 is applied. If the second clutch 62 is applied from this state, the sun gear 21 of the planetary gear unit 20 rotates forward to release the one-way clutch 76. In short, in the case of an upshift from the third speed to the fourth speed, the second clutch 62 may be applied. As a result, the shift can be executed by applying the one-way clutch at all the gear stages from the first speed to the fifth speed. Incidentally, the controls for applying/ releasing the frictional engagement elements in the case of setting other gear stages are similar to those of the gear transmission unit shown in FIG. 7.

Figure 12:
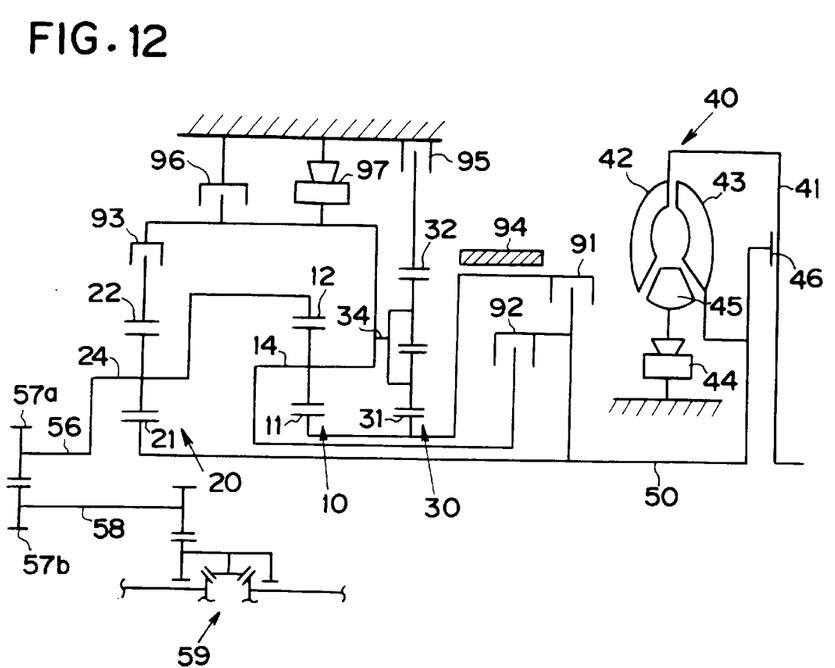
FIG. 12 is a skeleton diagram showing one embodiment of the present invention.

A further embodiment of the present invention will be described in the following. As shown in FIG. 12, the first planetary gear unit 10 and the second planetary gear unit 20 both of the single pinion type and the third planetary gear unit 30 of the double pinion type are arranged on a common axis. This arrangement is in the sequence of the third planetary gear unit 30, the first planetary gear unit 10 and the second planetary gear unit 20 like the foregoing embodiments from the side of the torque converter 40.

The carrier 34 of the third planetary gear unit 30 and the carrier 14 of the first planetary gear unit 10 are so connected to each other as to rotate together. Moreover, the sun gear 31 of the third planetary gear unit 30 and the sun gear 10 of the first planetary gear unit 10 are so connected to each other as to rotate together. Still moreover, the ring gear 12 of the first planetary gear unit 10 and the carrier 24 of the second planetary gear unit 20 are so connected to each other as to rotate together.

The sun gear 21 of the second planetary gear unit 20 is so connected to the input shaft 50 as to rotate together. Incidentally, this input shaft 50 is connected as in the foregoing embodiments to the turbine runner 43 of the torque converter 40. Moreover, the carrier 24 of the second planetary gear unit 20 is connected to an output shaft 56. Still moreover, this output shaft 56 is connected through a pair of counter gears 57a and 57b meshing with each other to a counter shaft 58, which is connected to a front differential 59.

A first clutch 91 is interposed between the input shaft 50 and the sun gear 31 of the third planetary gear unit 30, and a second clutch 92 is interposed between the input shaft 50 and the carrier 14 of the first planetary gear unit 10. A third clutch 93 is additionally provided for connecting the ring gear 22 of the second planetary gear unit 20 and either the carrier 24 of the first planetary gear unit 10 or the carrier 34 of the third planetary gear unit 30.

Here will be described the brake means for fixing the predetermined rotary elements. This brake means is exemplified by: a first brake 94 for fixing the sun gear 31 of the third planetary gear unit 30 and the sun gear 11 of the first planetary gear unit 10, as united with each other; a second brake 95 for fixing the ring gear 32 of the third planetary gear unit 30; and a third brake 96 for fixing the carrier 34 of the third planetary gear unit 30 and the carrier 14 of the first planetary gear unit 10, as united with each other. Moreover, a second one-way clutch 97 is arranged in parallel with the third brake 96.

Incidentally, the first brake 94 is made of a band brake and is arranged around the outer circumference of the clutch drum of the first clutch 91 for connecting the input shaft 50 and the sun gears 31 and 11 selectively.

Figure 13:
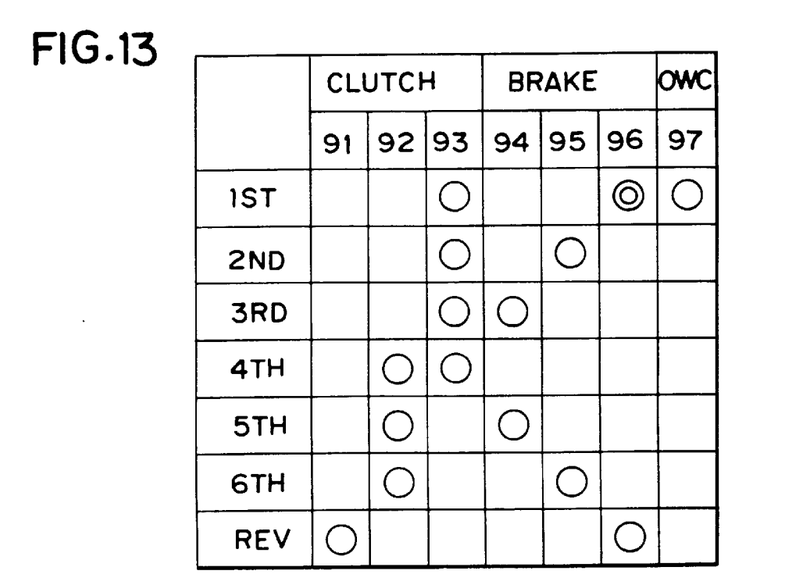
FIG. 13 is a table showing the clutch/brake application chart of frictional engagement elements for setting the individual gear stages of the embodiment.
Figure 14:
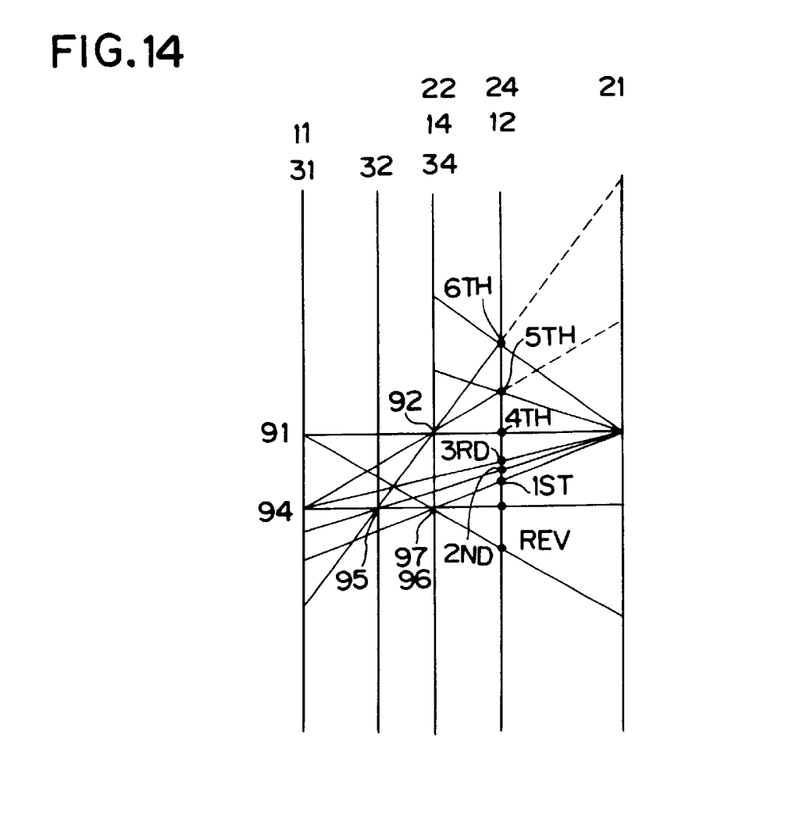
FIG. 14 is a rotational speed diagram of the gear transmission unit shown in FIG. 12.

According to the gear transmission unit described above, it is possible to set six forward gear stages and one or two reverse gear stages. FIG. 13 tabulates a clutch/brake applying chart of the individual frictional engagement elements for setting those gear stages, and FIG. 14 presents a collinear diagram. In FIG. 13: symbols ○ indicate the applied states; symbol ⊙ indicates that the element is applied at the engine braking time; and blanks indicate the released states. The individual gear stages will be described in the following.

The forward first speed is set if the one-way clutch 97 is applied by applying the third clutch 93. Specifically, in the second planetary gear unit 20, the sun gear 21 is connected to the input shaft 50 so that it rotates together with the input shaft 50, whereas the ring gear 22 is fixed by the one-way clutch 97 through the third clutch 93. As a result, the carrier 24 and the output shaft 56 connected to the former are decelerated to rotate forward (i.e., in the same direction as that of the input shaft 50) slower than the sun gear 21, i.e., the input shaft 50.

Incidentally, the engine braking, in which the power is inputted from the output shaft 56, can be effected while holding the first speed state by applying the third brake 96 which is arranged in parallel with the one-way clutch 97.

The forward second speed is set by applying the third clutch 93 and the second brake 95. In the second planetary gear unit 20, therefore, the sun gear 21 rotates forward while the load is being applied to the carrier 24 from the output shaft 56. As a result, the ring gear 22 will rotate backward so that the carrier 34, the sun gear 31 and the ring gear 32 in the third planetary gear unit 30 will rotate backward. However, since the ring gear 32 is fixed by the second brake 95, the carrier 34 rotates forward at a low speed whereas the sun gear 31 rotates backward at a low speed. In the first planetary gear unit 10, too, the sun gear 11 rotates backward at a low speed whereas the carrier 14 rotates forward at a low speed, so that the ring gear 12 rotates forward at a slightly lower speed than that of the case of the first speed. In other words, the carrier 24 united with the ring gear 12 and the output shaft 56 rotate forward at a slightly higher speed than that of the case of the first speed thereby to establish the second speed.

The forward third speed is set by applying the third clutch 93 and the first brake 94. In this case, too, since the load is applied from the output shaft 56 to the carrier 24 in the second planetary gear unit 20, the ring gear 22 will rotate backward so that the carrier 14 in the first planetary gear unit 10 will rotate backward. However, since the sun gear 11 is fixed by the first brake 94, the carrier 14 rotates forward so that the ring gear 12 in the first planetary gear unit 10 rotates forward faster than the carrier 14. In other words, the ring gear 12, the carrier 24 of the second planetary gear unit 20, as connected to the ring gear 12, and the output shaft 56 rotate forward slightly faster than the case of the second speed thereby to establish the third speed.

The forward fourth speed is set by applying the second clutch 92 and the third clutch 93. In the second planetary gear unit 20, therefore, the sun gear 21 and the ring gear 22 are connected to the input shaft 50 and rotate with the input shaft 50 so that they rotate as a whole. In short, the output shaft 56, as connected to the carrier 24, rotates at the speed equal to that of the input shaft 50 thereby to establish the directly connected gear stage of the gear ratio "1". In this case, the individual rotary elements rotate altogether in the third planetary gear unit 30 and the first planetary gear unit 10.

The forward fifth speed is set by applying the second clutch 92 and the first brake 94. In the first planetary gear unit 10, therefore, the carrier 14 and the input shaft 50 are rotated forward with the sun gear 11 being fixed by the first brake 94. As a result, the ring gear 12 is accelerated to rotate forward at the gear ratio (i.e,. the ratio of the tooth number of the sun gear to the tooth number of the ring gear) of the first planetary gear unit 10. In short, the output shaft 56 rotates at the R.P.M. which is increased from that of the input shaft 50 by the first planetary gear unit 10, to establish the forward fifth speed having a gear ratio smaller than "1". In this case, the sun gear 21 of the second planetary gear unit 20 rotates together with the input shaft 50, and the carrier 24 rotates forward at a higher speed so that the ring gear 22 rotates forward faster than the input shaft 50 and the output shaft 56. However, the R.P.M. of the ring gear 22 does not take so high a value because it is increased from the R.P.M. of the output shaft 56 in accordance with the gear ratio of the second planetary gear unit 20.

The forward sixth speed is set by applying the second clutch 92 and the second brake 95. In the third planetary gear unit 30, therefore, the carrier 34 is rotated together with the input shaft 50 while the ring gear 32 being fixed, so that the sun gear 31 rotates backward. In the first planetary gear unit 10, on the other hand, the sun gear 11 united with the sun gear 31 rotates backward, and the carrier 14 rotates forward together with the input shaft 50 so that the ring gear 12 is highly accelerated with respect to the input shaft 50 to rotate forward. In short, the output shaft 56 rotates at the R.P.M., which is increased from that of the input shaft 50 at the gear ratio between the third planetary gear unit 30 and the first planetary gear unit 10, so that the sixth speed is an overdrive stage having a smaller gear ratio than that of the forward fifth speed.

In this forward sixth speed, too, in the second planetary gear unit 20, the sun gear 21 rotates forward together with the input shaft 50, and the carrier 24 rotates forward faster than the sun gear 21, so that the ring gear 22 rotates forward faster than the united output shaft 56 and carrier 24. However, the acceleration ratio accords to the gear ratio of the second planetary gear unit 20 and is not so high that the R.P.M. of the ring gear 22 will not take an extremely high value.

The reverse gear stage is set by applying the first clutch 91 and the third brake 96. In the first planetary gear unit 10, therefore, the sun gear 11 is rotated together with the input shaft 50 while the carrier 14 being fixed by the third brake 96. As a result, the ring gear 12 and the output shaft 56 connected to the former are decelerated to rotate backward slower than the input shaft 50 thereby to establish the reverse stage. If the second brake 95 is applied in place of the third brake 96, the R.P.M. of the ring gear 12 of the first planetary gear unit 10 and the output shaft 56 united with the former can be increased in the reverse direction thereby to establish a second reverse stage having a small gear ratio.

In the gear transmission unit shown in FIG. 12, as described above, at the fifth and sixth speeds or the overdrive stages, the third clutch 93 is released to disconnect the carriers 34 and 14 and the ring gear 22 so that the R.P.M. of the rotary elements in the second planetary gear unit 20 can be prevented from any abnormal increase. As a result, the gear transmission unit, as shown in FIG. 12, can prevent the bearing members such as the bushes supporting the rotary elements from having their durabilities lowered and can prevent in advance the lubricating oil from being excessively agitated and according from being heated to a high temperature or from being deteriorated.

In the foregoing embodiments, the clutches and brakes are symbolically expressed to have the multi-disc structures, and the first brake 94 is exemplified by the band brake. However, the frictional engagement elements such as the brake means and the clutch means in the present invention should not be limited to the multi-disc structure but may be exemplified by using together frictional engagement elements and one-way clutches having no directivity in the torque transmitting direction.

Figure 15:
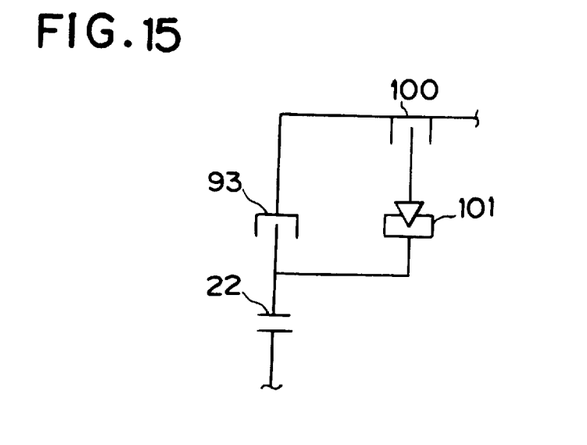
FIG. 15 is a skeleton diagram showing a portion of an example in which a multi-disc clutch and a one-way clutch arranged in series with the former are arranged as clutch means in parallel with a third clutch.
Figure 16:
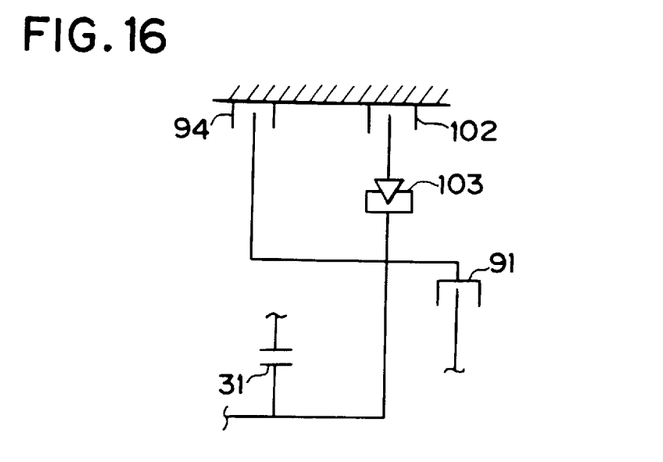
FIG. 16 is a skeleton diagram showing a portion of an example in which another multi-disc brake and a one-way clutch arranged in series with the former are arranged as brake means in parallel with a first brake having a multi-disc structure.
Figure 17:
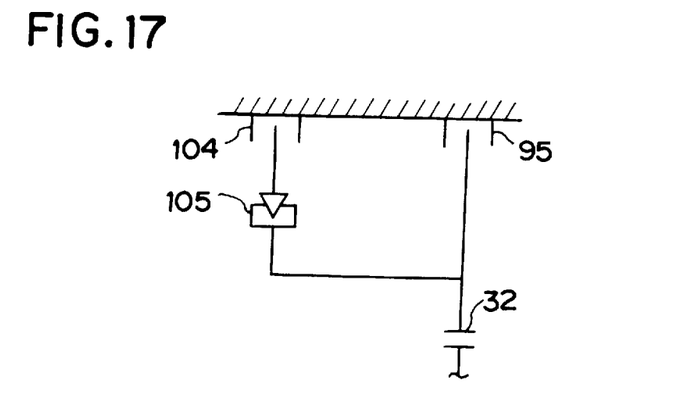
FIG. 17 is a skeleton diagram showing a portion of an example in which a multi-disc brake and a one-way clutch arranged in series with the former are arranged as brake means in parallel with a second brake.

For example, FIG. 15 shows an example in which a multi-disc clutch 100 and a one-way clutch 101 arranged in series with the former are arranged in parallel with the third clutch 93. On the other hand, FIG. 16 shows an example, in which the first brake 94 is given a multi-disc structure and in which another multi-disc brake 102 and a one-way clutch 103 arranged in series with the former are arranged in parallel with the first brake 94. Moreover, FIG. 17 shows an example in which a multi-disc brake 104 and a one-way clutch 105 arranged in series with the former are arranged in parallel with the second brake 95. On the other hand, FIG. 12 shows an example which is suited to the so-called "FF (front-engine and front drive) car." However, the present invention should not be limited to the foregoing embodiment but can be made suitable for the FR (front-engine and rear-drive) car if the output shaft 56 shown in FIG. 12 is extended in the axial direction and connected to the propeller shaft, for example.

Moreover, the present invention should not be limited to the foregoing embodiments but can be modified such that a one-way clutch or a multi-disc frictional engagement element may be further added, or such that the individual planetary gear units may be arranged in a sequence other than those of the foregoing embodiments, e.g., in a sequence of the second planetary gear unit 20, the third planetary gear unit 30 and the first planetary gear unit 10 from the side of the torque converter 40. Here will be summarized the advantages to be achieved by the present invention. According to one preferred mode of embodiment of the present invention, to the main transmission unit constructed of the paired single pinion type planetary gear units having the so-called "CR—CR" coupling, there is added the double pinion type planetary gear unit which is constructed to have its ring gear connected to the output element and one carrier of the main transmission unit and its sun gear connected to one sun gear of the main transmission unit so that its carrier may be selectively fixed by the brake. As a result, the steps widths of the gear ratios at the individual gear stages can take similar values even if the individual planetary gear units have their gear ratios set within the gear ratio ranges generally used. According to the present invention, therefore, it is possible to provide a small-sized light gear transmission unit which has little shifting shock but can facilitate the shift control.

According to another preferred mode of embodiment of the present invention, moreover, when the carriers and ring gears of the two sets of single pinion type planetary gear units are to be connected, a clutch is arranged between the carrier of one planetary gear unit and the ring gear of another planetary gear unit. As a result, the rotary elements can be prevented from any excessively high rotation although the gear transmission unit can set the six forward gear stages. According to the present invention, therefore, it is possible to provide a gear transmission unit which has practically excellent effects for improving the durability and for preventing the power loss in advance due to the oil agitation.

What is claimed is:

1. A gear transmission unit for an automatic transmission, which has:
    a single pinion type first planetary gear unit in which a pinion meshing with both a first sun gear and a first ring gear arranged concentrically with said first sun gear is rotatably retained by a first carrier;
    a single pinion type second planetary gear unit in which a pinion meshing with both a second sun gear and a second ring gear arranged concentrically with said second sun gear is rotatably retained by a second carrier, said second ring gear being connected to said first carrier, and in which said second carrier is connected to said first ring gear; and
    a double pinion type third planetary gear unit in which a first and a second pinions meshing with each other are rotatably retained by a third carrier and are arranged between a third sun gear and a third ring gear arranged concentrically with the third sun gear, and the first pinion meshes with the third sun gear and the second pinion meshes with the third ring gear, comprising:
        an output element connected to at least one of said first carrier and said third ring gear; and
        brake means for fixing said third carrier, and
        wherein said first carrier is connected to said third ring gear.

2. A gear transmission unit for an automatic transmission according to claim 1, further comprising:
    an input member for inputting a power to said gear transmission unit; and
    first clutch means for connecting said input member selectively to at least one of said first sun gear and said third sun gear.

3. A gear transmission unit for an automatic transmission according to claim 2, further comprising:
    second clutch means for connecting said input member selectively to said second carrier.

4. A gear transmission unit for an automatic transmission according to claim 3, further comprising:
    third clutch means for connecting said second sun gear selectively to said input member.

5. A gear transmission unit for an automatic transmission according to claim 1, further comprising:
    second brake means for fixing said second sun gear selectively.

6. A gear transmission unit for an automatic transmission according to claim 5, further comprising:
    third brake means for fixing said first ring gear and said second carrier selectively.

7. A gear transmission unit for an automatic transmission according to claim 2, further comprising:
    second brake means for fixing said second sun gear selectively.

8. A gear transmission unit for an automatic transmission according to claim 7, further comprising:
    third brake means for fixing said first ring gear and said second carrier selectively.

9. A gear transmission unit for an automatic transmission according to claim 3, further comprising:
    second brake means for fixing said second sun gear selectively.

10. A gear transmission unit for an automatic transmission according to claim 9, further comprising:
    third brake means for fixing said first ring gear and said second carrier selectively.

11. A gear transmission unit for an automatic transmission according to claim 4, further comprising:
    second brake means for fixing said second sun gear selectively.

12. A gear transmission unit for an automatic transmission according to claim 11, further comprising:
    third brake means for fixing said first ring gear and said second carrier selectively.

13. A gear transmission unit for an automatic transmission according to claim 12, further comprising:
    fourth clutch means interposed between said second sun gear and said second brake means;
    a one-way clutch interposed between said second brake means and said second carrier; and
    another one-way clutch arranged in parallel with said second brake means.

14. A gear transmission unit for an automatic transmission according to claim 12, further comprising:
    fifth clutch means for connecting said first ring gear and said second carrier selectively.

15. A gear transmission unit for an automatic transmission according to claim 14,
    wherein said fifth clutch means includes a multi-disc clutch and a one-way clutch arranged in series with each other, and another multi-disc clutch arranged in parallel with said multi-disc clutch and said one-way clutch.

16. A gear transmission unit for an automatic transmission according to claim 1,
    wherein said first brake means includes a multi-disc brake and a one-way clutch arranged in series with each other, and another multi-disc brake arranged in parallel with said multi-disc brake and said one-way clutch.

17. A gear transmission unit for an automatic transmission according to claim 5,
    wherein said second brake means includes a band brake.

18. A gear transmission unit for an automatic transmission according to claim 14,
    wherein said third brake means includes a multi-disc brake, and a one-way clutch arranged in parallel with said multi-disc brake.

19. A gear transmission unit for an automatic transmission according to claim 1, further comprising:
    a torque converter arranged on the same axis as that of said first to third planetary gear units.

20. A gear transmission unit for an automatic transmission according to claim 19, wherein said third planetary gear unit, said first planetary gear unit and said second planetary gear unit are arranged in a recited sequence from the side of said torque converter.

21. A gear transmission unit for an automatic transmission according to claim 19, wherein said second planetary gear unit, said first planetary gear unit and said third planetary gear unit are arranged in a recited sequence from the side of said torque converter.

22. A gear transmission unit for an automatic transmission according to claim 14, further comprising:

a torque converter arranged in parallel with the axis of said first to third planetary gear units; and transmission means for transmitting a torque from said torque converter to any of said first to third sun gears.

23. A gear transmission unit for an automatic transmission, which has:

a single pinion type first planetary gear unit in which a pinion meshing with both a first sun gear and a first ring gear arranged concentrically with said first sun gear is rotatably retained by a first carrier;

a single pinion type second planetary gear unit in which a pinion meshing with both a second sun gear and a second ring gear arranged concentrically with said second sun gear is rotatably retained by a second carrier, and in which said second carrier is connected to said first ring gear;

a double pinion type third planetary gear unit in which first and second pinions meshing with each other are rotatably retained by a third carrier and are arranged between a third sun gear and a third ring gear arranged concentrically with the third sun gear, and the first pinion meshes with the third sun gear and the second pinion meshes with the third ring gear, and in which said third carrier is connected to said first carrier;

first clutch means for connecting the first and third sun gears, which are connected to each other, selectively to an input element;

second clutch means for connecting the first and third carriers, which are connected to each other, selectively to said input element;

first brake means for selectively fixing the first and third sun gears which are connected to each other;

second brake means for fixing said third ring gear selectively; and third brake means for selectively fixing the first and third carriers which are connected to each other, comprising:

third clutch means for connecting the first and third carriers, which are connected to each other, selectively to the second ring gear, and wherein said second sun gear is connected at all times to said input element.

24. A gear transmission unit for an automatic transmission according to claim 23, further comprising:

an output element connected to said second carrier.

25. A gear transmission unit for an automatic transmission according to claim 23, further comprising:

a one-way clutch arranged in parallel with said third brake means.

26. A gear transmission unit for an automatic transmission according to claim 23, further comprising:

a multi-disc clutch and a one-way clutch arranged in parallel with said third clutch means and connected in series to each other.

27. A gear transmission unit for an automatic transmission according to claim 23, further comprising:

a multi-disc brake and a one-way clutch arranged in parallel with said first brake means and connected in series with each other.

28. A gear transmission unit for an automatic transmission according to claim 23, further comprising:

a multi-disc brake and a one-way clutch arranged in parallel with said second brake means and connected in series with each other.

* * * * *